Sept. 23, 1941.   A. FINESTONE   2,257,047
FUEL HEATING AND VAPORIZING SYSTEM FOR INTERNAL COMBUSTION ENGINES
Filed July 31, 1940   2 Sheets-Sheet 2
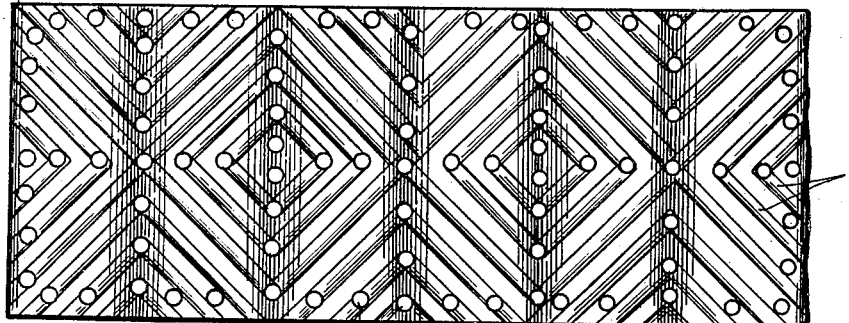
FIG. 3
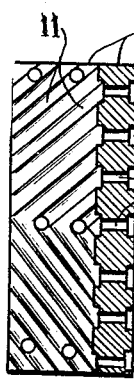
FIG. 5
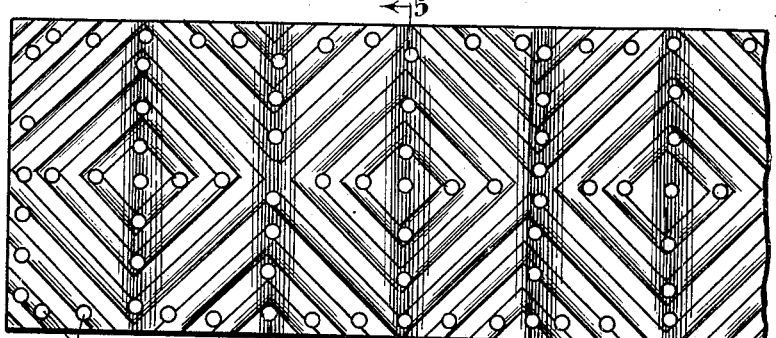
FIG. 4
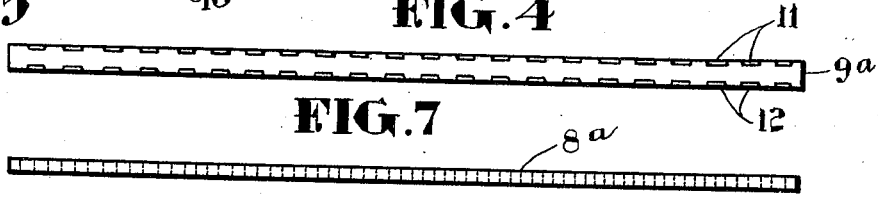
FIG. 7
FIG. 8
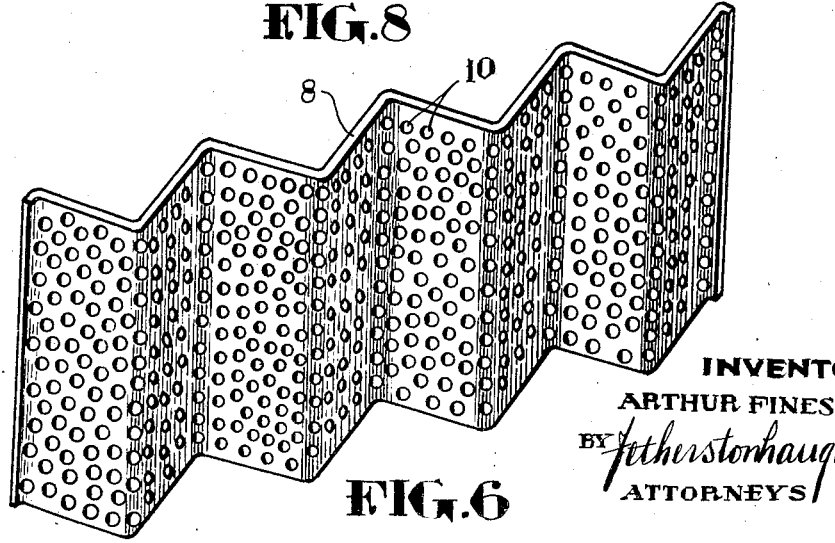
FIG. 6
INVENTOR
ARTHUR FINESTONE
BY Fetherstonhaugh & Co.
ATTORNEYS Patented Sept. 23, 1941

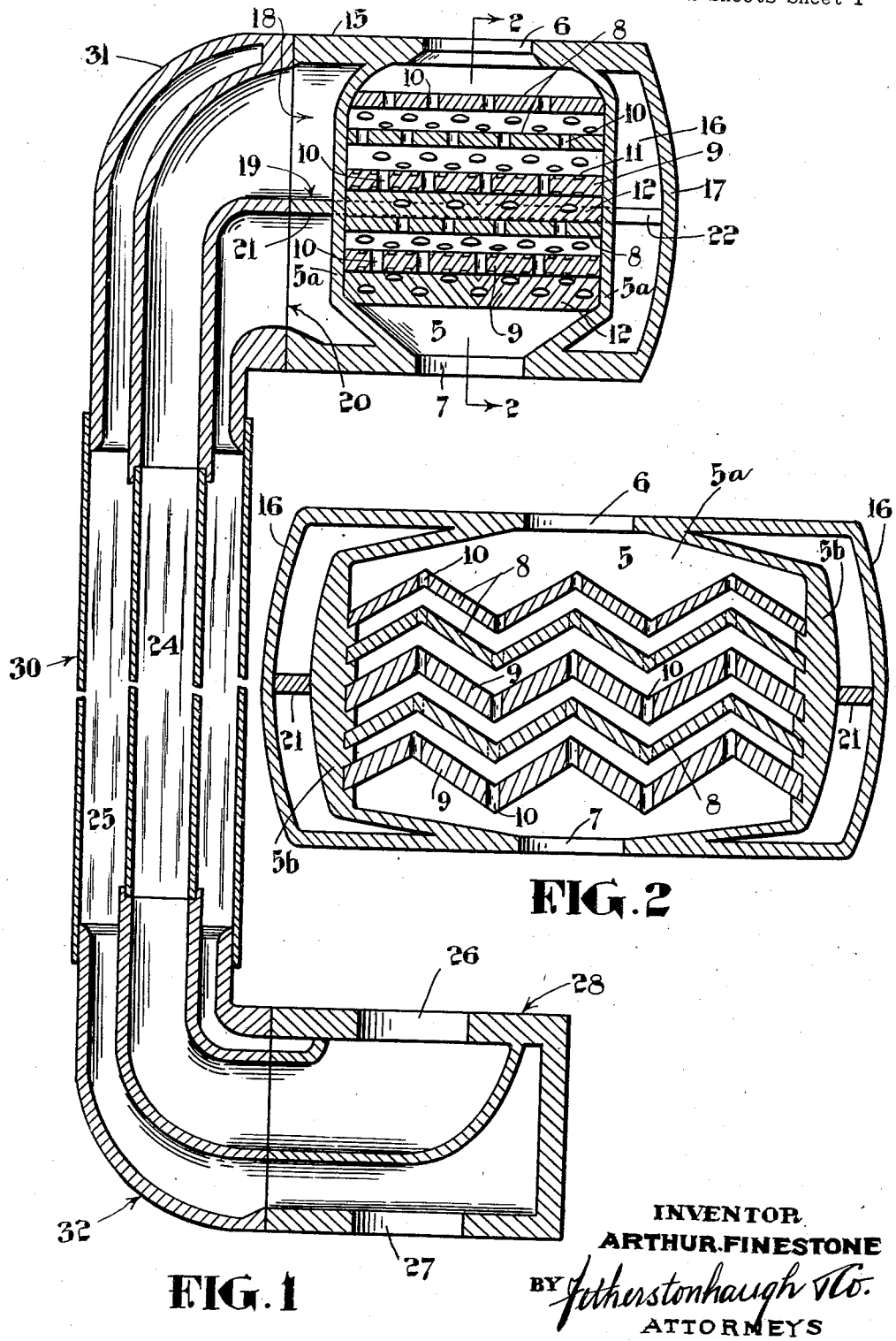

2,257,047

UNITED STATES PATENT OFFICE 2,257,047

FUEL HEATING AND VAPORIZING SYSTEM FOR INTERNAL COMBUSTION ENGINES

Arthur Finestone, Montreal, Quebec, Canada

Application July 31, 1940, Serial No. 348,967
In Great Britain September 1, 1939

4 Claims. (Cl. 48—180)

This invention relates to fuel vaporizers for internal combustion engines; and it comprises a fuel vaporizing chamber through which the fuel is passed to the engine cylinder, a plurality of heat conducting plates of novel form extending across said chamber between the fuel inlet and outlet openings thereof and novel means for passing exhaust gases from the engine cylinder around enclosing walls of said chamber so that the heat in said gases is efficiently utilized for vaporizing the fuel during its passage through the vaporizing chamber.

The principal object of the invention is to provide a fuel vaporizer of the character described which, by reason of its fuel vaporizing efficiency, enables heavier oils and distillates to be used as fuel instead of gasoline.

A further object of the invention is to provide a fuel vaporizer of the character described which may be easily adapted for application to various existing types of internal combustion engines without making any changes in the design or arrangement of the fuel inlet and exhaust gas manifolds with which such engines are provided by the manufacturers thereof.

According to the preferred embodiment of this invention the heat conducting plates are of wavy or sinuous form in longitudinal section and provided with a multiplicity of small openings through which the fuel passes from a fuel inlet opening located at one side of the zone occupied by said plates to a fuel outlet opening located at the opposite side of said zone. These perforated plates extend the full length and breadth of the vaporizing chamber and serve to break up the liquid fuel into minute particles which are rapidly vaporized by the heat derived from the exhaust gases which are passed around said chamber. Certain of the perforated plates are provided with grooves in their upper and lower surfaces. These grooves are inclined so that fuel entering or accumulating therein is directed outwardly toward side edges of the plates which are in heat conducting contact with side walls of the vaporizing chamber. Since the side walls of the vaporizing chamber are heated by direct contact with the exhaust gases it follows that these walls and the adjacent marginal portions of the heating plates will be at a substantially higher temperature than the central portion of the plates. Consequently, the deflecting action of the grooves causes the fuel entering these grooves to be guided towards the hottest regions of the vaporizing chamber and thus materially assists in the rapid vaporization of the fuel.

It is not absolutely essential that the perforated heat conducting plates be of wavy or sinuous form in longitudinal section. They may be made of any desired shape in longitudinal section or may be made perfectly flat throughout their length and width. Each heat conducting plate may also be made in one piece or any desired number of sections welded or otherwise secured together to provide a plate of the desired length and width. The grooving of the plates, especially in the case of plates which are perfectly flat throughout their length and width, may also be dispensed with.

According to the specific embodiment selected for illustration the vaporizing chamber is adapted to be connected between the carburetor and the intake manifold of the engine. The exhaust gases are circulated around the vaporizing chamber by passages formed in an enclosed heater casing to which the exhaust gases are delivered from the exhaust manifold. It is pointed out, however, that the vaporizing chamber and the exhaust gas passages surrounding said chamber may be cast as integral parts of a combined intake and exhaust manifold. This latter embodiment is not specifically shown or claimed in the present application but is mentioned as one example of various modifications to which the invention is susceptible.

Proceeding now to a more detailed description reference will be had to the accompanying drawings, in which—

Fig. 1 is a sectional view of a complete vaporizing assembly designed in accordance with this invention.

Fig. 2 is a transverse sectional view taken substantially along the line 2—2 of Fig. 1.

Fig. 3 is a top plan view of one of the grooved heat conducting plates.

Fig. 4 is a bottom plan view of the heat conducting plate appearing in Fig. 3.

Fig. 5 is a transverse sectional view taken substantially along the line 5—5 of Fig. 4.

Fig. 6 is a perspective view of the non-grooved heat conducting plates used in conjunction with the grooved plates.

Fig. 7 is a side elevation of a modified form of grooved plate which is perfectly flat throughout its length and width.

Fig. 8 is a view showing a flat plate which may be substituted for the sinuous plate shown in Fig. 6.

Referring more particularly to the drawings, 5 designates a fuel vaporizing chamber provided with a top fuel inlet 6 adapted to be connected to a carburettor (not shown) and a bottom fuel outlet 7 adapted to be connected to an engine manifold (not shown). Vertically spaced heat conducting plates 8 and 9 extend across the full length and width of the chamber 5 between the fuel inlet and outlet openings 6 and 7. These plates are preferably wavy or sinuous in longitudinal section as clearly shown in Figs. 1, 4, 5 and 6, and are provided with a multiplicity of small openings 10. The plates 9 are preferably made of steel and are relatively thin compared to the plates 8 which are preferably made of brass. The upper and lower surfaces of each plate 8 are provided with a plurality of diagonally inclined grooves indicated at 11 and 12. The inclination of these grooves is such that fuel entering same is guided or deflected toward the side walls 5a of the vaporizing chamber. This assures rapid vaporization of liquid fuel accumulating on the upper surfaces of the grooved plates since the side edges of these plates are at a somewhat higher temperature than the central portions of the plates owing to the fact that the side edges are in contact with the side walls 5a of the vaporizing chamber which, in turn, are in direct heat interchanging contact with the hot exhaust gases as hereinafter pointed out. In place of the wavy or sinuous plates shown in Figs. 3 to 6 inclusive, I may use corresponding flat plates 8a and 9a as shown in Figs. 7 and 8.

The vaporizing chamber 5 is enclosed by a heater casing 15 provided with end walls 16 spaced from the end walls 5b of the vaporizing chamber and with a side wall 17 which is spaced from one of the side walls 5a of said chamber. Exhaust gases enter the heater casing 15 through an inlet opening 18 provided at one side of a partition 19 and leave said casing through an outlet opening 20 at the opposite side of said partition. As here shown the partition 19 comprises a U-shaped member arranged with its bight portion 21 extending across the open side of heater casing 15 and serving to separate the opening 18 from opening 20, the leg portions 22 of said partition extending along the central portions of the end walls 5b of the vaporizing chamber 5 from the openings 18 and 20 to the inner surface of wall 17. From this it will be seen that exhaust gases entering the heater casing 15 through the opening 18 flow along one side of the partition 19 to the wall 17 and then flow in the reverse direction along the opposite side of said partition to the outlet opening 20.

The exhaust gas inlet and outlet openings 18 and 20 of casing 15 are connected by inner and outer passages 24 and 25 to exhaust gas inlet and outlet openings 26 and 27 provided in opposite walls of a casing 28. The casing 28 is adapted to be mounted on the engine block with the opening 26 arranged to receive exhaust gases from the outlet opening of the exhaust gas manifold (not shown) and with the opening 27 connected to the exhaust pipe to which the gases are ordinarily passed directly from the exhaust gas manifold. Portions of the passages 24 and 25 are formed by a removable section generally indicated at 30 which has one end 31 bolted or otherwise secured to the heater casing 17 and the other end 32 bolted or otherwise secured to the casing 28.

The purpose in making the section 30 separate from casings 15 and 28 is to enable the design of this section to be modified to permit application of the casings 15 and 28 to various types of engines.

In the present instance I have shown a type of vaporizer in which the fuel flows downwardly through the vaporizing chamber to the fuel inlet manifold of the engine but it will be readily understood that the parts may be designed so that the fuel is supplied to the lower portion of the vaporizing chamber to flow upwardly therethrough to the intake manifold of the engine. These and various other modifications are considered as falling within the scope and spirit of the invention as defined by the appended claims.

Having thus described my invention, what I claim is:

1. A fuel vaporizer comprising a vaporizing chamber provided with oppositely located fuel inlet and outlet openings and a plurality of perforated heat conducting plates extending across the full length and breadth of said chamber between said openings, certain of the plates being provided with diagonally inclined grooves in the lower surface thereof and diagonally inclined grooves in the upper surface thereof, the inclination of both sets of grooves being such that fuel entering same is deflected or guided toward the marginal portions of the plates.

2. A fuel vaporizer comprising a vaporizing chamber provided with oppositely located fuel inlet and outlet openings and a plurality of perforated heat conducting plates extending across the full length and breadth of said chamber between said openings, certain of the plates being provided with diagonally inclined grooves formed in the lower surface thereof, the inclination of such grooves being such that fuel entering same is deflected or guided toward the marginal portions of the plates.

3. A fuel vaporizer comprising a vaporizing chamber provided with oppositely located fuel inlet and outlet openings and a plurality of perforated heat conducting plates extending across the full length and breadth of said chamber between said openings, certain of the plates being provided with diagonally inclined grooves formed in the upper surface thereof, the inclination of said grooves being such that fuel entering same is deflected or guided toward the marginal portions of the plates.

4. A fuel vaporizer comprising a vaporizing chamber provided with oppositely located fuel inlet and outlet openings and a plurality of perforated heat conducting plates extending across the full length and breadth of said chamber between said openings, all of said plates being of wavy or sinuous form in longitudinal section and certain of said plates being provided with transversely extending grooves inclined so that fuel entering or accumulating in said grooves is deflected or guided toward the marginal portions of the plates.

ARTHUR FINESTONE.